(12) United States Patent
Luo et al.

(10) Patent No.: US 12,554,711 B2
(45) Date of Patent: Feb. 17, 2026

(54) PIPELINE QUERY TRANSFORMATION SYSTEM

(71) Applicant: International Business Machines Corporation, Armonk, NY (US)

(72) Inventors: Lin Luo, Carp (CA); Yong Wang, Pointe Claire (CA); Laszlo Toeroek, Toronto (CA); Boris Kuschel, Gatineau (CA); Ian Fraser Watts, Stouffville (CA)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 18/589,670

(22) Filed: Feb. 28, 2024

(65) Prior Publication Data

US 2025/0272284 A1    Aug. 28, 2025

(51) Int. Cl.
*G06F 16/2453* (2019.01)
*G06Q 10/067* (2023.01)

(52) U.S. Cl.
CPC ..... *G06F 16/24534* (2019.01); *G06Q 10/067* (2013.01)

(58) Field of Classification Search
USPC ........................................................ 707/765
See application file for complete search history.

(56) References Cited

U.S. PATENT DOCUMENTS

| | | | |
|---|---|---|---|
| 5,664,173 A | 9/1997 | Fast | |
| 5,909,678 A | 6/1999 | Bergman et al. | |
| 7,831,614 B2 | 11/2010 | Deffler | |
| 8,140,558 B2 | 3/2012 | Kiefer et al. | |
| 8,972,433 B2 | 3/2015 | Mclean et al. | |
| 10,318,398 B2 | 6/2019 | Rickard et al. | |
| 11,550,783 B2 | 1/2023 | Lee et al. | |
| 11,727,007 B1 * | 8/2023 | Kulkarni | G06N 3/08 707/769 |
| 12,265,528 B1 * | 4/2025 | Lan | G06F 16/243 |
| 12,346,315 B1 * | 7/2025 | Zhang | G06F 16/24578 |
| 2004/0078359 A1 | 4/2004 | Bolognese et al. | |

(Continued)

FOREIGN PATENT DOCUMENTS

| | | |
|---|---|---|
| CN | 101464862 A | 6/2009 |
| CN | 108027833 B | 4/2022 |

(Continued)

OTHER PUBLICATIONS

ClickHouse, "Kusto phase 1 #37961", https://github.com/ClickHouse/ClickHouse/pull/37961,(Retrieved: Jan. 25, 2024), 7 pages.

(Continued)

Primary Examiner — Joshua Bullock
(74) Attorney, Agent, or Firm — CANTOR COLBURN LLP; Teddi Maranzano

(57) ABSTRACT

Computer-implemented methods for a pipeline query transformation system are disclosed herein. Aspects include validating an input query of business logic in a pipeline query language using a pipeline dialect by a pipeline processor of a pipeline query transformation system. Aspects also include parsing the input query into pipeline operators. Aspects further include processing the pipeline operators using the pipeline dialect by the pipeline processor. Aspects include generating a query context by processing the pipeline operators. Aspects also include generating an SQL query from the query context.

20 Claims, 4 Drawing Sheets

(56) References Cited

U.S. PATENT DOCUMENTS

| | | | | |
|---|---|---|---|---|
| 2014/0280259 A1* | 9/2014 | McGillin | ............ | G06F 16/2452 |
| | | | | 707/756 |
| 2022/0244929 A1 | 8/2022 | Skvortsov | | |
| 2022/0358127 A1* | 11/2022 | Talluri | ................. | G06F 16/245 |
| 2023/0004563 A1 | 1/2023 | Zhang et al. | | |
| 2023/0078177 A1 | 3/2023 | Wang et al. | | |
| 2023/0325441 A1* | 10/2023 | Krishnaprasad | ....... | G16H 10/60 |
| | | | | 707/765 |
| 2024/0045863 A1* | 2/2024 | Rafidi | ................... | G06F 16/243 |
| 2025/0200039 A1* | 6/2025 | Billa | ......................... | G06F 8/41 |

FOREIGN PATENT DOCUMENTS

| | | |
|---|---|---|
| EP | 2369502 A2 | 9/2011 |
| JP | 2009503678 A | 1/2009 |

OTHER PUBLICATIONS

ClickHouse, "Support Kusto Query Language dialect—phase 2 #42510", https://github.com/ClickHouse/ClickHouse/pull/42510, (Retrieved: Jan. 25, 2024), 25 pages.

IBM Newsroom, "IBM Unveils Cloud-Native SIEM Built to Maximize Security Teams' Time and Talent", https://newsroom.ibm.com/2023-11-07-IBM-Unveils-Cloud-Native-SIEM-Built-to-Maximize-Security-Teams-Time-and-Talent, (Retrieved: Feb. 28, 2024), 2023, 4 pages. Grace Period Disclosure under 35 U.S.C. § 102(b)(1)(A).

IBM Security QRadar, "Empowering today's modern SOC with enterprise-grade AI", https://www.ibm.com/products/qradar-cloud-native-siem, (Retrieved: Feb. 27, 2024), 9 pages. Grace Period Disclosure under 35 U.S.C. § 102(b) (1)(A).

* cited by examiner

PIPELINE QUERY TRANSFORMATION SYSTEM

STATEMENT REGARDING PRIOR DISCLOSURES BY THE INVENTOR OR A JOINT INVENTOR

The following disclosure(s) are submitted under 35 U.S.C. 102(b)(1)(A):

DISCLOSURES: IBM NEWSROOM, "IBM Unveils Cloud-Native SIEM Built to Maximize Security Teams' Time and Talent", Nov. 7, 2023, https://newsroom.ibm.com/2023-11-07-IBM-Unveils-Cloud-Native-SEIM-Built-to-Maximize-Security-Teams-Time-and-Talent; 4 pages.
IBM Security QRadar, "Empowering today's modern SOC with enterprise-grade AI" releasing in early 2024; https://ibm.com/prouducts/qradar-cloud-native-siem; 9 pages.

BACKGROUND

The present invention generally relates to databases, and more specifically, to computer systems, computer-implemented methods, and computer program products for a pipeline query transformation system.

Applications utilize and store different types of data, such as configuration data, business logic data, and the like. Many applications utilize a structure query language (SQL) to manage and analyze data. SQL is used to query structured and semi-structured data stored in databases. SQL is used in conjunction with other technologies that have different data models than relational databases. Such technologies can be faster for data processing and analysis on large, unstructured datasets while still leveraging the familiarity of SQL for data analysts and developers.

Mapping the business needs to the correct SQL queries to retrieve appropriate information can be difficult for data driven applications in light of the evolution of SQL to include complex functionalities to support advanced analytics. Creating accurate and precise SQL queries requires professional training, specific domain knowledge, and hands-on working experience. In some cases, productivity in creating accurate SQL queries can decrease as the business logic of an application grows in size or complexity.

SUMMARY

Embodiments of the present invention are directed to a computer-implemented method for a pipeline query transformation system. According to an aspect of the invention, a computer-implemented method includes validating an input query of business logic in a pipeline query language using a pipeline dialect by a pipeline processor of a pipeline query transformation system. The method includes parsing the input query into pipeline operators. The method further includes processing the pipeline operators using the pipeline dialect by the pipeline processor. The method also includes generating a query context by processing the pipeline operators. The method further includes generating an SQL query from the query context.

In one embodiment of the present invention, processing the pipeline operators includes determining that a pipeline operator of the pipeline operators is a data source and initializing the query context. The method also includes transforming the source argument to a new query context by invoking a new pipeline processor in response to determining the pipeline operator has a source argument.

In one embodiment of the present invention, processing the pipeline operators includes determining that a pipeline operator of the pipeline operators is a query context producer. The method includes generating SQL operators from the pipeline operator. The method further includes generating a new query context that includes the query context and the SQL operators embedded as sources. The method includes replacing the query context with the new query context.

In one embodiment of the present invention, processing the pipeline operators includes determining that a pipeline operator of the pipeline operators is a query context decorator. The method further includes generating SQL operators from the pipeline operator. The method also includes modifying the query context using the SQL operators.

In one embodiment of the present invention, the method includes generating customized SQL operators for a pipeline operator of the pipeline operators using a customized transformation query rule. The method also includes adding the customized SQL operators to the query context.

In one embodiment of the present invention, the method includes detecting the pipeline dialect of the input query and selecting the pipeline dialect for the pipeline processor.

In one embodiment of the present invention, wherein the query context is a query representation that produces a tabular data output when executed.

According to another non-limiting embodiment of the invention, a system having a memory having computer readable instructions and one or more processors for executing the computer readable instructions, the computer readable instructions controlling the one or more processors to perform operations. The operations include validating an input query of business logic in a pipeline query language using a pipeline dialect by a pipeline processor of a pipeline query transformation system. The operations include parsing the input query into pipeline operators. The operations further include processing the pipeline operators using the pipeline dialect by the pipeline processor. The operations also include generating a query context by processing the pipeline operators. The operations further include generating an SQL query from the query context.

According to another non-limiting embodiment of the invention, a computer program product for a pipeline query transformation system is provided. The computer program product includes a computer-readable storage medium having program instructions embodied therewith, the program instructions executable by a processor to cause the processor to perform operations. The operations include validating an input query of business logic in a pipeline query language using a pipeline dialect by a pipeline processor of a pipeline query transformation system. The operations include parsing the input query into pipeline operators. The operations further include processing the pipeline operators using the pipeline dialect by the pipeline processor. The operations also include generating a query context by processing the pipeline operators. The operations further include generating an SQL query from the query context.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
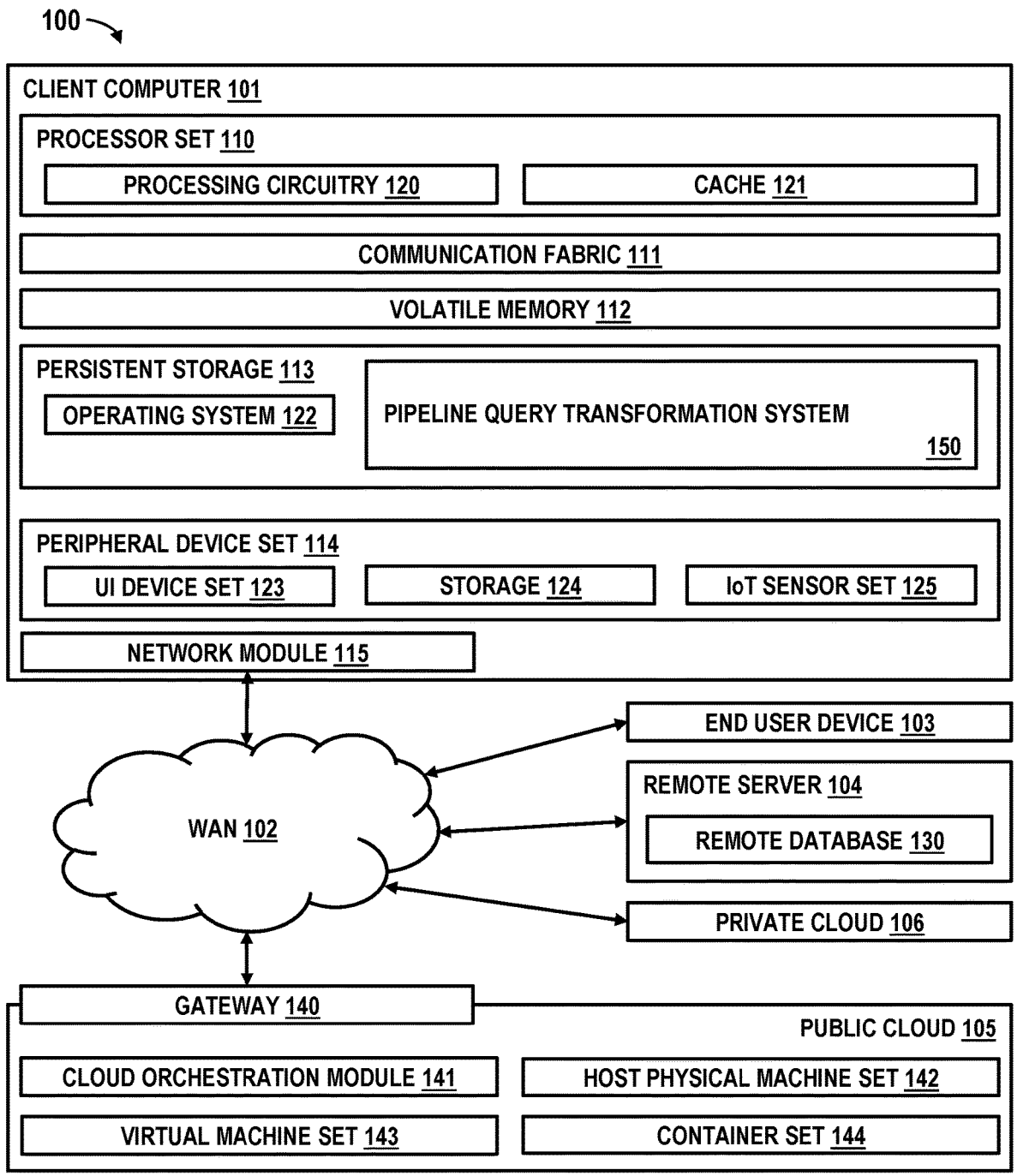
FIG. 1 depicts a block diagram of an example computer system for use in conjunction with one or more embodiments of the present invention.

Disclosed herein are methods, systems, and computer program products for a pipeline query transformation system that receives an input query from a user in a pipeline-oriented query language (also referred to as pipeline) and transforms the input query into an SQL query that can be used by an application. As discussed above, creating accurate and precise SQL queries can be challenging due to multiple factors. Pipeline-oriented query languages have been widely used to express data flows in more logical and natural language like manner. Users often have domain knowledge that can easily be depicted as business logic by describing how data is transformed in a pipeline. The system described herein can automatically convert data flows expressed in pipeline format to functionally and semantically equivalent SQL queries that can be used or executed directly by a data provider. The system empowers users by reducing the learning curve of creating accurate SQL queries and improving productivity for power users. By leveraging the domain knowledge of business users who can easily depict a business logic by describing how data is transformed in a pipeline, the system provides a more intuitive and efficient means of generating SQL queries. Users are able to quickly create complex data transformation logic that fully utilizes the capabilities of the underlying database system without being burdened by the complicated syntax of SQL.

In some embodiments, users can provide an input query in the form of a pipeline. Pipelines usually have the following format:

DataSource|Operator_1|Operator_2| . . . |Operator_N

The pipeline flows from left to right with each pipeline operator functioning as a form of transformation. The output of one pipeline operator is an input of the next pipeline operator. Pipeline operators can have additional input parameters as well. Users can define a complex data transformation process using a chain of pipeline operators based on business logic. Pipeline operators are composed into a transformation pipeline to perform the data transformation. A typical transformation pipeline consists of a source and then zero or more subsequent pipeline operators. The pipeline processor of the pipeline query transformation system does not have a restriction on the number or sequence of pipeline operators. Pipeline operators in a pipeline are combined and transformed into a single SQL query. Pipeline operators are logically independent. New pipeline operators can easily be defined and incorporated into an existing pipeline. Pipeline processors of a pipeline query transformation system convert an input query, usually in pipeline form into an SQL query, enabling the execution of the pipeline directly on relational database management systems that support SQL query execution.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as receiving input queries in pipeline-oriented languages and transforming the input queries to SQL queries by a pipeline query transformation system 150. In addition to the pipeline query transformation system 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the pipeline query transformation system 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Client computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the pipeline query transformation system 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in the pipeline query transformation system 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
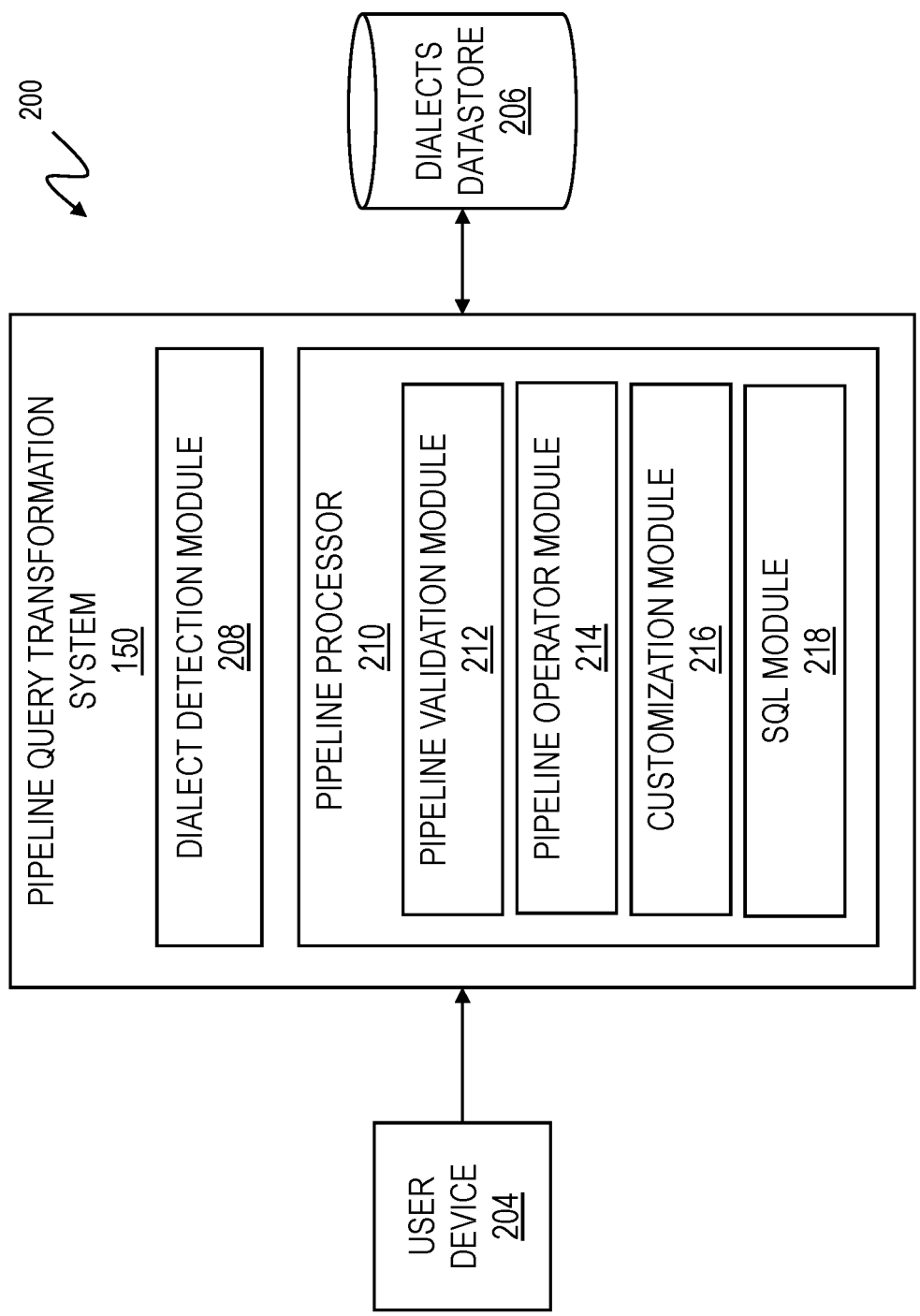
FIG. 2 is a block diagram of a system for a pipeline query transformation system in accordance with one or more embodiments of the present invention.

Referring now to FIG. 2, a system 200 for a pipeline query transformation system 150 in accordance with one or more embodiments of the present invention is shown. In exemplary embodiments, the system 200 includes a pipeline query transformation system 150 that may be embodied in a computer 101, such as the one shown in FIG. 1. As illustrated, the system 200 includes the pipeline query transformation system 150 that is associated with one or more user devices 204. The pipeline query transformation system 150 is configured to receive an input query from a user device 204. The pipeline query transformation system 150 includes a dialect detection module 208 that receives the input query and identifies a dialect of pipeline-oriented programming languages. In some embodiments, the dialect detection module 208 uses data from a dialects datastore 206 to determine the dialect of the input query received from the user device 204. A dialect of a pipeline-oriented query language is a variation or extension of the language that does not change its intrinsic nature. In some instances, a dialect is created for use in a domain-specific language, often a subset. In some embodiments, a new dialect is created to remedy insufficient, inadequate, or illegitimate implementations of a language.

The pipeline query transformation system 150 also includes a pipeline processor 210. The pipeline processor includes a pipeline validation module 212, a pipeline operator module 214, a customization module 216, and/or an SQL module 218. In some embodiments, the pipeline processor 210 receives the input query and the identified dialect of the pipeline-oriented programming language of the input query, processes the input query, and generates a query context. In some embodiments, a query context is an internal query representation that produces a tabular data output when executed. In some embodiments, the context query can be processed to generate an SQL query.

In some embodiments, to process the input query, the pipeline validation module 212 analyzes the input query based on the identified dialect to determine whether the input query is valid (i.e., does not contain syntax errors, etc.).

The pipeline operator module 214 receives and parses the input query into pipeline operators. The pipeline operator module 214 can recursively and/or iteratively process the pipeline operators. The pipeline operator module 214 categorizes the pipeline operators. In some embodiments, the pipeline operator module 214 categorizes the pipeline operators into one of three categories: data source, query context producer, and query context decorator. In some embodiments, the pipeline operator module 214 transforms the pipeline operator into SQL operators and modifies the query context based on the categorization of the pipeline operator, as further described in relation to FIGS. 3 and 4.

In some embodiments, a user and/or organization can provide a customized SQL query from the input query by providing a configuration file, library, or other resource that contains one or more customized transformation query rules to implement custom operator logic. In some embodiments, the customization module 216 uses the configuration file, library, and/or other resource to apply custom function transformations on one or more pipeline operators. In some embodiments, the customization module 216 recursively applies the customized transformation query rules to the received pipeline operators. In some embodiments, the pipeline operators reference functions that need to be transformed into customized SQL expressions to form an SQL query. In some embodiments, the customized transformation query rule can transform the same pipeline definitions of the pipeline operator into different SQL expressions based on the customized transformation query rules.

In response to determining that there are no further pipeline operators to process, the SQL module 218 transforms the query context into the corresponding SQL query. In some embodiments, the SQL module 218 serializes the query context to generate the SQL query. In some embodiments, upon generation of the SQL query, the pipeline processor 210 can transmit the SQL query to a designated module, such as an SQL parser, as discussed in FIG. 3. In some embodiments, the pipeline processor 210 transmits the SQL query to the user device 204 for review.

Figure 3:
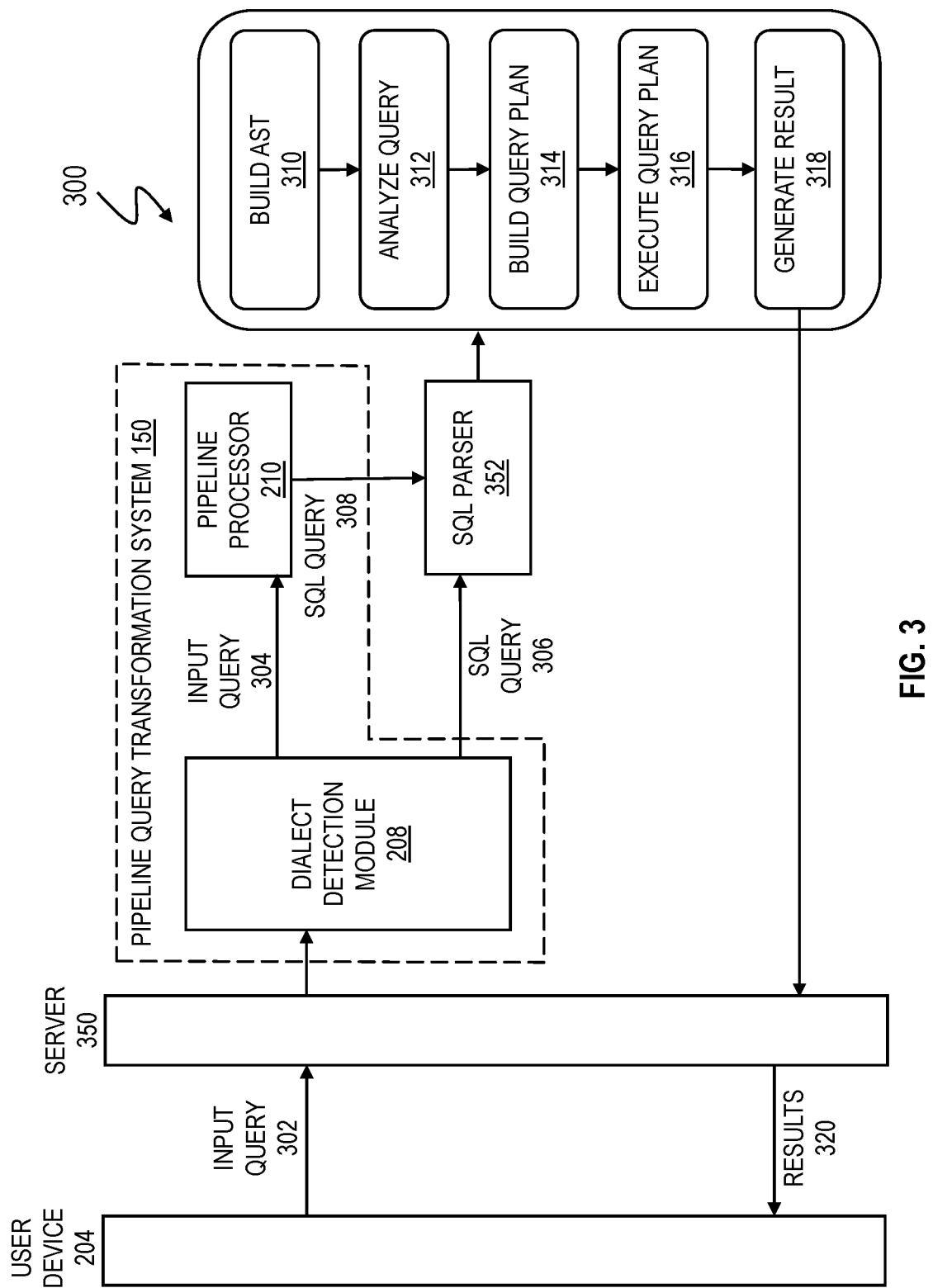
FIG. 3 is a data flow diagram depicting the flow of data in a system that includes a pipeline query transformation system in accordance with one or more embodiments of the present invention.

Referring now to FIG. 3, a data flow diagram depicting the flow of data in system 300 that includes a pipeline query transformation system 150 in accordance with one or more embodiments of the present invention. A user interacting with a user device 204, such as a desktop computer, laptop computer, cell phone, tablet, or the like, provides an input query. In some embodiments, the input query can be in a pipeline-oriented programming language. The user device 204 transmits 302 the input query to a server 350. In some embodiments, the pipeline query transformation system 150 resides on the server 350 or in a cloud computing environment accessed by the server 350. The pipeline query transformation system 150 receives the input query. The dialect detection module 208 analyzes the input query to identify a pipeline dialect of the input query and selects the pipeline dialect for the pipeline processor 210. The input query is transmitted 304 from the dialect detection module 208 to the pipeline processor 210 for processing in response to identifying a pipeline dialect for the input query. In some embodiments, the dialect detection module 208 determines that the input query is an SQL query and does not require further processing. The dialect detection module 208 transmits 306 the input query, which the dialect detection module 208 has determine is an SQL query, to the next module, such as the SQL parser 352 of the system 300.

Figure 4:
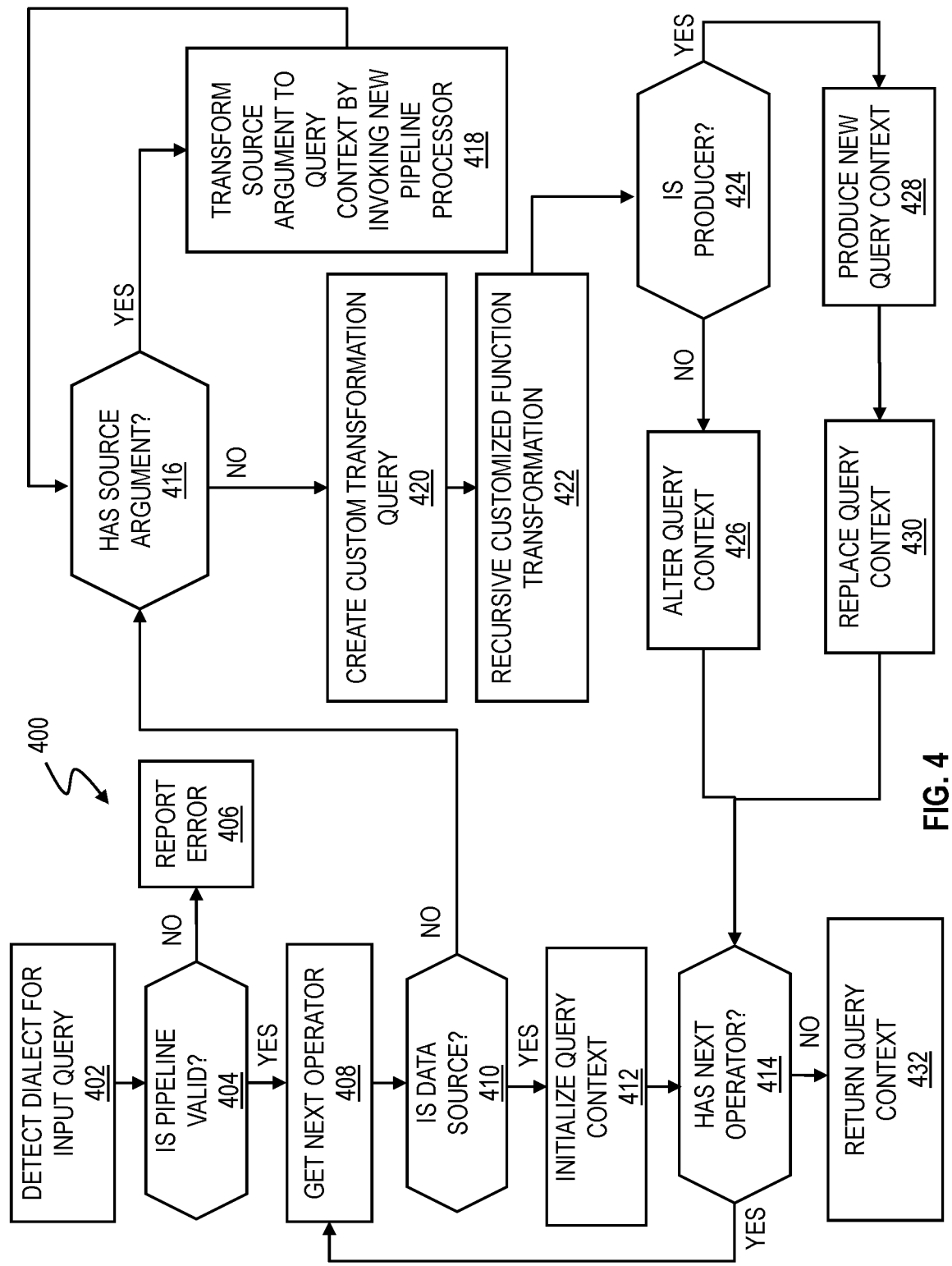
FIG. 4 is a flowchart of a method for a pipeline query transformation system in accordance with one or more embodiments of the present invention.

Upon receiving the transmission 304 of the input query, the pipeline processor 210 validates the input query and transforms the input query into an SQL query, as further discussed in FIG. 4. The generated SQL query is transmitted 308 to the SQL parser 352 of the system 300 for further processing. In some embodiments, the generated SQL query is transmitted from the pipeline query transformation system 150 to the user device 204 for review. In some embodiments, the pipeline query transformation system 150 receives feedback from the user device 204, such as modifications to the SQL query or approval to transmit 308 the SQL query to the SQL parser 352 for further processing.

In response to receiving an SQL query, either through the transmission 306 from the dialect detection module 208 or the transmission 308 from the pipeline processor, the SQL parser 352 can process the SQL query. Processing the SQL query can include, but is not limited to, analyzing the SQL query and deconstructing the SQL query based on the SQL syntax, identifying query components and decomposing the SQL query into elements, (e.g., tables, columns, joins, filters, subqueries, etc.). At block 310, SQL parser 352 builds an Abstract Syntax Tree (AST) using the elements and query components. At block 312, the SQL parser 352 analyzes the query using the AST. At block 314, the SQL parser 352 builds a query plan. A query plan is a sequence of steps used to access data in an SQL relational database management system. At block 316, the SQL parser 352 executes the query plan which then generates results at block 318. The SQL parser 352 then transmits 320 the results to the server 350 which can then transmit the results of the input query to the user device 204.

Referring now to FIG. 4, a flowchart of a method 400 for a pipeline query transformation system 150 in accordance with one or more embodiments of the present invention is shown. The method 400 begins at block 402 by detecting a pipeline dialect for an input query. In some embodiments, a user utilizes a user device 204 to generate an input query in pipeline form. Pipelines usually have the following format:

DataSource|Operator_1|Operator_2| . . . |Operator_N

The pipeline flows from left to right with each pipeline operator functioning as a form of transformation. The output of one pipeline operator is an input of the next pipeline operator. Pipeline operators can have additional input parameters as well. Users can define a complex data transformation process using a chain of pipeline operators based on business logic. Pipeline operators are composed into a transformation pipeline to perform the data transformation. A typical transformation pipeline consists of a source and then zero or more subsequent pipeline operators.

As there can be multiple dialects for pipelines, a dialect detection module 208 of the pipeline query transformation system 150 receives an input query and identifies a dialect for the input query. In some embodiments, the dialect detection module 208 uses data from a dialects datastore 206 to identify a dialect for the input query. In some embodiments, the dialect detection module 208 determines that metadata associated with the input query identifies a specific pipeline dialect. The dialect detection module 208 transmits the input query and the identified pipeline dialect to the pipeline processor 210.

Next at block 404, the method 400 determines whether the pipeline of the input query is valid. In some embodiments, the pipeline validation module 212 analyzes the pipeline of the input query to determine whether the pipeline is valid (i.e., does not contain syntax errors, etc.). The pipeline validation module 212 utilizes the identified pipeline dialect from block 402 in determining whether the pipeline is valid. In some embodiments, the pipeline validation module 212 analyzes the input query based on the identified dialect to determine whether the input query is valid (i.e., does not contain syntax errors, etc.). If the pipeline validation module 212 determines that the pipeline is not valid and contains some type of error, then at block 406, the pipeline validation module 212 generates an error message and reports the error message back to the user device 204.

If the pipeline validation module 212 determines that the pipeline is valid, then at block 408, the method proceeds to get the next pipeline operator. In some embodiments, the pipeline operator module 214 receives and parses the input query into pipeline operators. The pipeline operator module 214 retrieves the first or next pipeline operator parsed from the pipeline of the input query. At block 410, the pipeline operator module 214 determines if the pipeline operator is categorized as a data source using the identified pipeline dialect. The data source category indicates that the pipeline operator is a data source reference or pipeline definition. If the pipeline operator module 214 determines that the pipeline operator is categorized as a data source, then at block 412, the pipeline operator module 214 initializes a query context and the method proceeds to block 414.

At block 414, the pipeline operator module 214 determines whether there is another pipeline operator. If the pipeline operator module 214 determines that there is another pipeline operator, the method proceeds back to block 408, where pipeline operator module 214 retrieves and processes the next pipeline operator. If at block 414, the pipeline operator module 214 determines there is not a next pipeline operator, the method proceeds to block 432, where the pipeline operator module 214 transmits the query context. In some embodiments, the SQL module 218 generates an SQL query using the query context. The SQL module 218 generates the SQL query by serializing the query context. The pipeline query transformation system 150 transmits the SQL query to an SQL parser 352 as discussed in FIG. 3. In some embodiments, the SQL query is transmitted back to the user device 204 for review.

Referring back to block 410, if the pipeline operator module 214 determines that the pipeline operator is not categorized as a data source, the method proceeds to block 416. At block 416, the pipeline operator module 214 determines whether the pipeline operator has a source argument. If the pipeline operator module 214 determines that the pipeline operator has a source argument, the method proceeds to block 418.

At block 418, the pipeline operator module 214 transforms the source argument to add to the query context by invoking a new pipeline processor 210. In response to the new pipeline processor 210 transforming the pipeline operator, the method proceeds back to block 416. If the pipeline operator module 214 determines that the pipeline operator does not have a source argument, the method proceeds to block 420.

At block 420, the customization module 216 creates a custom transformation query. In some embodiments, the customization module 216 receives one or more customized transformation query rules to implement custom operator logic on pipeline operators. In some embodiments, the customization module 216 generates a configuration file, library, or other resource for the customized transformation query rules. In some embodiments, the customization module 216 receives a configuration file, library, or other resource that contains one or more customized transformation query rules from an administrator of the pipeline query transformation system 150 and/or user device 204.

At block 422, the customization module 216 recursively applies the customized transformation query rules to the received pipeline operators. In some embodiments, the pipeline operators reference functions that need to be transformed into customized SQL expressions to form an SQL query. In some embodiments, the customized transformation query rule can transform the same pipeline definitions of the pipeline operator into different SQL expressions based on the customized transformation query rules.

At block 424, the pipeline operator module 212 determines whether the pipeline operator is a query context producer. In some embodiments, the pipeline operator module 212 uses the pipeline dialect identified by the dialect detection module 208. The pipeline operator module 212 analyzes the pipeline operator to determine if the contents of the pipeline operator correspond to the query context producer category. In some embodiments, the pipeline operator module 212 determines that the pipeline operator is not a query context producer. In some embodiments, if the pipeline operator is not a query context producer, then the pipeline operator module 212 determines that the pipeline operator is a query context decorator and the method proceeds to block 424.

At block 426, the pipeline operator module 212 transforms the pipeline operator into SQL operators. In some embodiments, the pipeline operator module 212 transforms the pipeline operator into SQL operators and alters the query context by adding the SQL operators. The method then proceeds to block 414.

If at block 424, the pipeline operator module 212 determines that the pipeline operator is a query context producer, the method proceeds to block 428. A query context producer indicates that the pipeline operator will generate a new query context and replace the existing query context.

At block 428, the pipeline operator module 212 produces a new query context. In some embodiments, the pipeline operator module 212 generates SQL operators from the query context and generates a new query context by embedding the SQL operators and the existing query context as sources. Then at block 430, the pipeline operator module 212 replaces the existing query context with the new query context generated at block 428. The method proceeds to block 414.

At block 414, the pipeline operator module 214 determines whether there is another pipeline operator. If the pipeline operator module 214 determines that there is another pipeline operator, the method proceeds back to block 408, where pipeline operator module 214 retrieves and processes the next pipeline operator. If at block 414, the pipeline operator module 214 determines there is not a next pipeline operator, the method proceeds to block 432, where the pipeline operator module 214 transmits the query context. In some embodiments, the SQL module 218 generates an SQL query using the query context. The SQL module 218 generates the SQL query by serializing the query context.

The pipeline query transformation system 150 transmits the SQL query to an SQL parser 352. In some embodiments, the SQL query is transmitted back to the user device 204 for review.

To provide further clarity regarding the systems and methods described herein, example input queries and corresponding SQL queries generated by an example pipeline query transformation system 150 are provided below.

TABLE 1

| Input Query | Events |
|---|---|
| SQL Query | SELECT * FROM events |

In the example depicted in Table 1, an input query "Events" is transformed by the pipeline query transformation system 150 into an SQL query. The input query is a single data source reference.

TABLE 2

| Input Query | Ledger<br>\| extend PriceInCents = 100 * Price<br>\| sort by PriceInCents asc<br>\| project Fruit, PriceInCents<br>\| take 2; |
|---|---|
| SQL Query | SELECT<br>  Fruit,<br>  100 * Price AS PriceInCents<br>FROM Ledger<br>ORDER BY PriceInCents ASC NULLS FIRST<br>LIMIT 2 |

In the example depicted in Table 2, the input query includes a pipeline that is defined with a source and three query context decorators. As a result, the SQL query does not contain any subqueries.

TABLE 3

| Input Query | Customers \| summarize avg(sales) \| getschema; |
|---|---|
| SQL Query | SQL query output:<br>SELECT *<br>FROM getschema(<br>  SELECT avg(sales) AS avg_sales<br>  FROM Customers<br>  )<br>) |

In the example depicted in Table 3, the input query includes a pipeline defined with a source and two pipeline operators that are query context producers. As a result, the SQL query is a chain of two SELECT queries.

TABLE 4

| Input Query | events<br>\| project storage_time, payload_bytes<br>\| where format_datetime(storage_time, 'yyyy-mm-dd') >= format_datetime(now( ), 'yyyy-mm-dd')<br>\| summarize SumDailyPayloadSize = sum(payload_bytes) by format_datetime(storage_time, 'yyyy-mm-dd') |
|---|---|
| SQL Query | SELECT<br>  formatDateTime(storage_time, '%Y-%M-%d') AS Columns1,<br>  sum(payload_bytes) AS SumDailyPayloadSize<br>FROM<br>  (<br>  SELECT<br>    storage_time,<br>    payload_bytes<br>  FROM events |

TABLE 4-continued

| | WHERE formatDateTime(storage_time, '%Y-%M-%d') >= formatDateTime(now64(9, 'UTC'), '%Y-%M-%d')<br>)<br>GROUP BY Columns1 |
|---|---|

In the example depicted in Table 4, the input query contains a pipeline that includes three operators—"project", "where", and "summarize". The "project" and "where" operators are query context decorators. They do not create new query contexts. Instead, they alter the query context by changing projection list and adding filters. In contrast, "summarize" is a query context producer because it changes the semantic meaning of the query context. The "summarize" operator creates a new query context using the original query context as a source. As a result, the output SQL query has one subquery.

TABLE 5

| Input Query | Customers<br>\| where Age in ((Customers\|project Age\|where Age <30))<br>\| order by LastName; |
|---|---|
| SQL Query | SELECT *<br>FROM Customers<br>WHERE Age IN (<br>  SELECT Age<br>  FROM Customers<br>  WHERE Age <30<br>)<br>ORDER BY LastName DESC NULLS LAST |

In Table 5, the example shows that an operator can take other pipeline definitions as arguments. In this example, the "where" operator of the input query references another pipeline as a part of an expression. As a result, the clause of the output SQL query contains a subquery.

TABLE 6

| Input Query | FactTable<br>\| project Row, Personal, Family<br>\| lookup kind=leftouter (DimTable \| where Personal == 'Bill') on Personal, Family<br>\| lookup kind=inner DimTable on Personal, Family<br>\| order by Row asc; |
|---|---|
| SQL Query | SELECT *<br>FROM<br>(<br>  SELECT *<br>  FROM<br>  (<br>    SELECT<br>      Row,<br>      Personal,<br>      Family<br>    FROM FactTable<br>  ) AS left_<br>  LEFT JOIN<br>  (<br>    SELECT *<br>    FROM DimTable<br>    WHERE Personal = 'Bill'<br>  ) AS right_ USING (Personal, Family)<br>) AS left_<br>INNER JOIN DimTable AS right_ USING (Personal, Family)<br>ORDER BY Row ASC NULLS FIRST |

In Table 6, the example shows that an operator of the input query can take other pipeline definitions or source as arguments. The "lookup" operator in the input query references another pipeline as arguments. As a result, the SQL query has joins between the subqueries.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:
1. A computer-implemented method comprising:
receiving an input query in a pipeline query language;
receiving, from an external configuration file that defines at least one customized transformation query rule supplied by a user;
detecting a pipeline dialect of the input query;
validating the input query using the pipeline dialect by a pipeline processor of a pipeline query transformation system;
parsing the input query into pipeline operators;
processing the pipeline operators using the pipeline dialect by the pipeline processor;
generating a query context for each of the pipeline operators;
generating an SQL query from the query context of each of the pipeline operators;
applying the at least one customized transformation query rule to at least one pipeline operator to generate cus- tomized SQL operators, wherein the customized SQL operators are added to the query context and used in generating the SQL query; and executing the SQL query, wherein the SQL query is SQL representation of the input query.

2. The computer-implemented method of claim 1, wherein processing the pipeline operators comprises:
   determining that a pipeline operator of the pipeline operators is a data source;
   initializing the query context; and
   in response to determining the pipeline operator has a source argument, transforming the source argument to a new query context by invoking a new pipeline processor.

3. The computer-implemented method of claim 1, wherein processing the pipeline operators comprises:
   determining that a pipeline operator of the pipeline operators is a query context producer;
   generating SQL operators from the pipeline operator;
   generating a new query context comprising the query context and the SQL operators embedded as sources; and
   replacing the query context with the new query context.

4. The computer-implemented method of claim 1, wherein processing the pipeline operators comprises:
   determining that a pipeline operator of the pipeline operators is a query context decorator;
   generating SQL operators from the pipeline operator; and
   modifying the query context using the SQL operators.

5. The computer-implemented method of claim 1, further comprising:
   generating customized SQL operators for a pipeline operator of the pipeline operators using a customized transformation query rule; and
   adding the customized SQL operators to the query context.

6. The computer-implemented method of claim 1, further comprising:
   selecting the pipeline dialect for the pipeline processor.

7. The computer-implemented method of claim 1, wherein the query context is a query representation that produces a tabular data output when executed.

8. A system comprising:
   a non-transitory memory having computer readable instructions; and
   one or more processors for executing the computer readable instructions, the computer readable instructions controlling the one or more processors to perform operations comprising:
     receiving an input query in a pipeline query language;
     receiving, from an external configuration file that defines at least one customized transformation query rule supplied by a user,
     detecting a pipeline dialect of the input query;
     validating the input query using the pipeline dialect by a pipeline processor of a pipeline query transformation system;
     parsing the input query into pipeline operators;
     processing the pipeline operators using the pipeline dialect by the pipeline processor;
     generating a query context for each of the pipeline operators;
     generating an SQL query from the query context of each of the pipeline operators;
     applying the at least one customized transformation query rule to at least one pipeline operator to generate customized SQL operators, wherein the customized SQL operators are added to the query context and used in generating the SQL query; and
     executing the SQL query, wherein the SQL query is SQL representation of the input query.

9. The system of claim 8, wherein the operations to process the pipeline operators further comprise:
   determining that a pipeline operator of the pipeline operators is a data source;
   initializing the query context; and
   in response to determining the pipeline operator has a source argument, transforming the source argument to a new query context by invoking a new pipeline processor.

10. The system of claim 8, wherein the operations to process the pipeline operators further comprise:
    determining that a pipeline operator of the pipeline operators is a query context producer;
    generating SQL operators from the pipeline operator;
    generating a new query context comprising the query context and the SQL operators embedded as sources; and
    replacing the query context with the new query context.

11. The system of claim 8, wherein the operations to process the pipeline operators further comprise:
    determining that a pipeline operator of the pipeline operators is a query context decorator;
    generating SQL operators from the pipeline operator; and
    modifying the query context using the SQL operators.

12. The system of claim 8, wherein the operations further comprise:
    generating customized SQL operators for a pipeline operator of the pipeline operators using a customized transformation query rule; and
    adding the customized SQL operators to the query context.

13. The system of claim 8, wherein the operations further comprise:
    selecting the pipeline dialect for the pipeline processor.

14. The system of claim 8, wherein the query context is a query representation that produces a tabular data output when executed.

15. A computer program product comprising a computer readable storage medium having program instructions embodied therewith, the program instructions executable by a processor to cause the processor to perform operations comprising:
    receiving an input query in a pipeline query language;
    receiving, from an external configuration file that defines at least one customized transformation query rule supplied by a user;
    detecting a pipeline dialect of the input query;
    validating the input query using the pipeline dialect by a pipeline processor of a pipeline query transformation system;
    parsing the input query into pipeline operators;
    processing the pipeline operators using the pipeline dialect by the pipeline processor;
    generating a query context for each of the pipeline operators; and
    generating an SQL query from the query context of each of the pipeline operators;

applying the at least one customized transformation query rule to at least one pipeline operator to generate customized SQL operators, wherein the customized SQL operators are added to the query context and used in generating the SQL query; and executing the SQL query, wherein the SQL query is SQL representation of the input query.

16. The computer program product of claim 15, wherein the operations to process the pipeline operators further comprise:

determining that a pipeline operator of the pipeline operators is a data source;

initializing the query context; and in response to determining the pipeline operator has a source argument, transforming the source argument to a new query context by invoking a new pipeline processor.

17. The computer program product of claim 15, wherein the operations to process the pipeline operators further comprise:

determining that a pipeline operator of the pipeline operators is a query context producer;

generating SQL operators from the pipeline operator;

generating a new query context comprising the query context and the SQL operators embedded as sources; and replacing the query context with the new query context.

18. The computer program product of claim 15, wherein the operations to process the pipeline operators further comprise:

determining that a pipeline operator of the pipeline operators is a query context decorator;

generating SQL operators from the pipeline operator; and modifying the query context using the SQL operators.

19. The computer program product of claim 15, wherein the operations further comprise:

generating customized SQL operators for a pipeline operator of the pipeline operators using a customized transformation query rule; and adding the customized SQL operators to the query context.

20. The computer program product of claim 15, wherein the operations further comprise:

selecting the pipeline dialect for the pipeline processor.

* * * * *